United States Patent [19]

Kornrumpf et al.

[11] 4,053,813
[45] Oct. 11, 1977

[54] DISCHARGE LAMP BALLAST WITH RESONANT STARTING

[75] Inventors: William P. Kornrumpf, Schenectady, N.Y.; Thomas M. Jahns, Twin Lakes, Wis.

[73] Assignee: General Electric Company, Schenectady, N.Y.

[21] Appl. No.: 662,529

[22] Filed: Mar. 1, 1976

[51] Int. Cl.² .................................................. H05B 37/00
[52] U.S. Cl. ............................ 315/206; 315/DIG. 2; 315/DIG. 7; 315/209 R; 315/283
[58] Field of Search .............. 315/209, 206, DIG. 5, 315/283, 278, DIG. 2, DIG. 7; 331/113 A

[56] References Cited
U.S. PATENT DOCUMENTS

| | | | |
|---|---|---|---|
| 2,964,676 | 12/1960 | Davies et al. | 331/113 A |
| 2,971,166 | 2/1961 | Schultz | 331/113 A |
| 3,008,068 | 11/1961 | Wilting | 315/206 |
| 3,084,283 | 4/1963 | Grunwaldt | 315/283 X |
| 3,146,406 | 8/1964 | Wilting | 331/113 A |
| 3,611,021 | 10/1971 | Wallace | 331/113 A |
| 3,723,848 | 3/1973 | Miller | 331/113 A |
| 3,754,160 | 8/1973 | Jensen | 331/113 A |

Primary Examiner—Saxfield Chatmon, Jr.
Attorney, Agent, or Firm—Jack E. Haken; Joseph T. Cohen; Jerome C. Squillaro

[57] ABSTRACT

A circuit for operating an electric discharge lamp comprises an inductor in series with the lamp, a capacitor in parallel with the lamp, and a transistorized inverter circuit connected in series with the inductor and the lamp. The operating frequency of the inverter increases with increasing load. A harmonic of the inverter output frequency is initially established at the resonant frequency of the inductor and capacitor to produce a high open circuit lamp starting voltage. Upon establishment of an electrical discharge in the lamp, the inverter frequency increases to provide efficient, stable lamp operation.

3 Claims, 4 Drawing Figures

DISCHARGE LAMP BALLAST WITH RESONANT STARTING

BACKGROUND OF THE INVENTION

This invention relates to electronic circuits for ballasting discharge lamps. More particularly, this invention relates to high frequency ballast circuits incorporating series resonant starting circuits.

Electric discharge lamps are characterized by a negative resistance volt-ampere characteristic and a relatively high ionization potential which tends to decrease as the lamp electrodes heat during operation. Auxiliary circuits for operating such lamps must provide high open circuit voltage for starting and a positive series impedance for ballasting stable lamp operation. These characteristics are typically obtained by use of a series ballast having high leakage inductance. Such prior art circuits, however, draw substantial amounts of reactive current and are, therefore, generally unsuitable for operating discharge lamps in conjunction with transistorized power inverters.

Lamp ballast circuits of the prior art have incorporated capacitors connected in parallel with the discharge lamp to resonate an inductive ballast and provide high open circuit starting voltage. Such capacitors have been chosen to resonate at the operating frequency of the primary power source and, thus, to achieve increased voltage for lamp ionization. This technique loses effectiveness, however, as the inductive and capacitive components age and the resonant frequency of the starting circuit shifts from that of the power source.

SUMMARY OF THE INVENTION

In accordance with the present invention we provide methods and circuits for starting and operating electric discharge lamps in conjunction with a transistorized inverter circuit. A series inductive ballast is resonated with a capacitor connected in parallel to the lamp discharge. The inverter is designed to seek and excite the resonant frequency of a high Q load, while operating at a frequency removed from the resonant value of a low Q load. The circuit, therefore, seeks a resonant high voltage condition for initial operation of a cold lamp and a somewhat lower steady-state voltage for normal lamp operation. The circuit is well suited for operation into somewhat inductive loads and, by seeking the resonant frequency of the ballast components, compensates for the effects of component aging.

BRIEF DESCRIPTION OF THE DRAWING

The novel features of the present invention are set forth in the appended claims. The invention itself, together with the advantages thereof, may best be understood by reference to the following description of a preferred embodiment taken in connection with the attached drawings in which:

DESCRIPTION OF THE PREFERRED EMBODIMENTS

Electric discharge lamps are characterized by a high impedance prior to starting. Upon application of a relatively high starting voltage, the lamp terminal voltage decreases and the operating current increases in a negative resistance fashion. Auxiliary components for use with such lamps must provide a relatively high open circuit voltage to ionize the lamp and a positive series impedance or other current limiting function to stabilize the negative resistance lamp operating characteristic.

Figure 1:
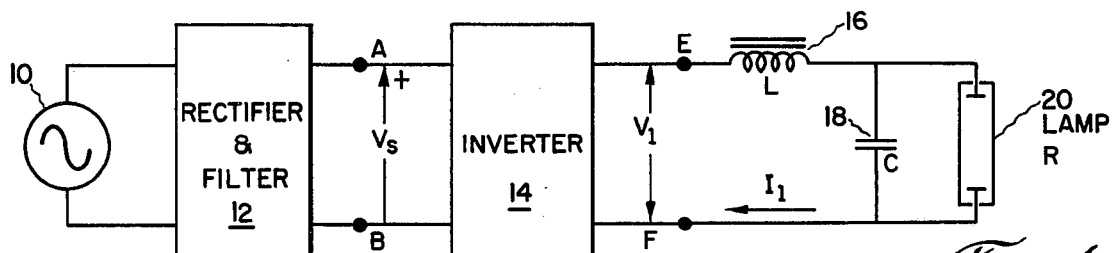
FIG. 1 is a block diagram of a lamp operating circuit.

FIG. 1 is a circuit for operating a discharge lamp 20 from a relatively low frequency alternating current source 10. The power source 10 which, may for example, comprise a 60 cycle power circuit, is rectified and filtered to direct current in a conventional circuit 12. The direct current output of the filter circuit is applied to the input terminals A and B of a high frequency, transistorized inverter circuit 14 (more particularly described below). The output voltage of the inverter circuit $V_1$ at the terminals E and F is applied to a lamp circuit comprising an inductor 16 connected in series with the parallel combination of a capacitor 18 and the discharge lamp 20. The Q of the circuit formed by the capacitor 18 and the inductor 16 should be high in the absence of the lamp load; that is greater than 2 or 3. The output current of the inverter 14 which flows through the series inductor 16 is designated $I_1$.

Figures 2, 3:
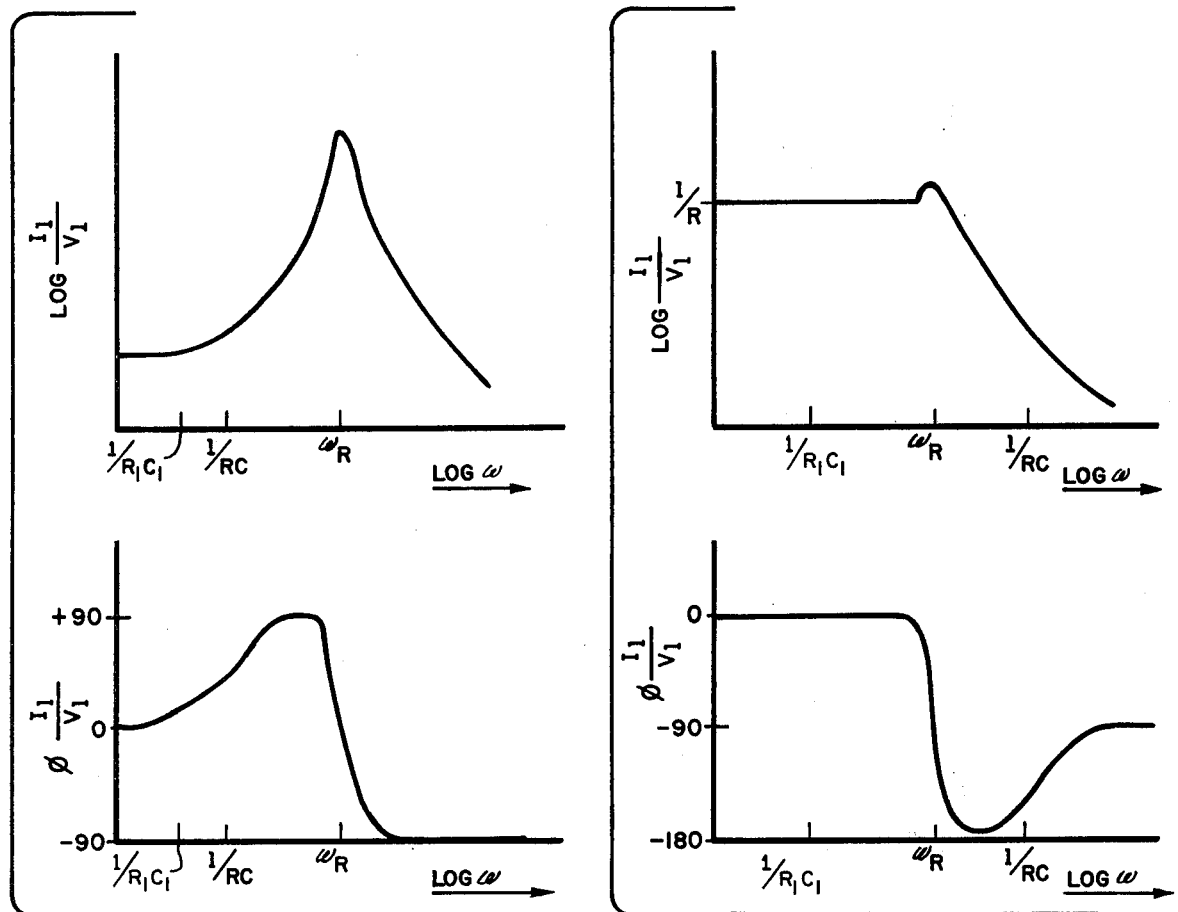
FIG. 2 is a Bode plot showing the admittance characteristics of a resonant ballast circuit prior to lamp ionization.
FIG. 3 is a Bode plot showing the admittance characteristics of a resonant ballast circuit after lamp ionization.

Prior to the establishment of an electrical discharge, the lamp 20 presents a very high impedance. FIG. 2 is a Bode plot of the magnitude and phase of the lamp circuit admittance at the terminals E and F under such conditions. The circuit admittance magnitude rises to a maximum value at the series resonant frequency $\omega_R$ of the capacitor 18 and the inductor 16. The circuit impedance is seen to be capacitive below the resonant frequency and inductive above that frequency.

The establishment of an electrical discharge greatly lowers the effective impedance R of the lamp 20 and reduces the Q of the resonant circuit formed by the inductor 16 and the capacitor 18. FIG. 3 is a Bode plot of the magnitude and phase of the impedance presented at the inverter output terminals E and F after ignition of the lamp.

Figure 4:
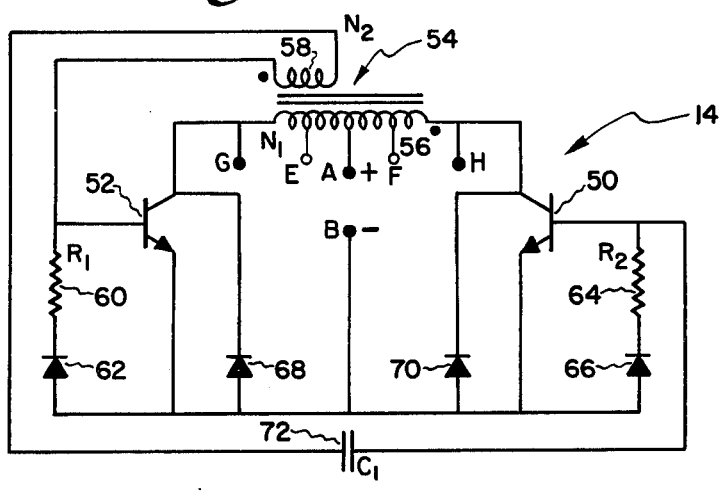
FIG. 4 is a schematic diagram of a transistorized inverter for use in the circuit of FIG. 1.

FIG. 4 is a schematic diagram of a transistorized inverter circuit for operation in the lamp circuit of FIG. 1. The inverter produces a substantially square wave output at a frequency which is chosen (in a manner more specifically described below) to the approximately one-third the resonant frequency of the output circuit $$1/6\pi \sqrt{LC} \tag{1}$$

The inverter 14 comprises a transformer 54 having a center tapped primary winding 56. Positive supply voltage is applied to the center of the winding 56 at terminal A and the high frequency output voltage of the inverter is produced at autotransformer taps on winding 56 at terminals E and F. If an isolated output is desired the output voltage may, alternately, be drawn from an additional secondary winding (not illustrated) on transformer 54. The ends of winding 56, terminals G and H are respectively connected to the collectors of npn transistors 52 and 50. The emitters of the transistors 52 and 50 are connected together to a negative supply voltage terminal B. A pair of diodes 68 and 70 are respectively connected between the collector and emitter of the transistors 52 and 50 and serve to bypass inductive currents flowing in the transistor circuits. The base of the transistor 52 is connected to ground through a bias resistor 60 having a value $R_1$ and a series diode 62. The base of the transistor 50 is likewise connected to ground through a resistor bias 64 having a value $R_2 = R_1$ and a series diode 66. One end of a secondary winding 58 on the transformer 54 is connected to the base of transistor 52. The opposite end of the secondary winding 58 is connected through a series capacitor 72 having value $C_1$ to the base of transistor 50. The polarities of the transformer windings 58 and 56 are chosen so that the base of the transistor 52 goes positive at such times as the collector of the transistor 50 goes positive. The reciprocal time constant of the resistors $R_1 = R_2$ and the capacitor $C_1$ is a significant factor in the operation of the circuit and is noted on the Bode plots of FIGS. 2 and 3.

The operation of the inverter may be illustrated, in a somewhat simplified manner, by assuming that the transistor 50 has just switched off and that the transistor 52 has just switched on. The voltage between the terminals A and G will equal the supply voltage $V_s$ and the voltage across the secondary winding 58 will equal $V_s$ multiplied by the transformer turns ratio $N_2/N_1$. At this time the voltage on the capacitor 72 is approaching but less than the voltage across the winding 58; thus, the sum of the capacitor 72 voltage and the voltage on the secondary winding 58 appears across the base emitter junction of transistor 52 in series with the resistor 64 and the diode 66. During this half cycle, the capacitor 72 is first discharged and then charged in the opposite direction by the winding 58. The base drive current through the base emitter junction of the transistor 52 is thus largest at the beginning of the half cycle and dies exponentially towards zero with a time constant $R_2C_1$. At the same time, the voltage drop across the diode 66 and the resistor 64 serves to reverse bias the transistor 50 and maintain it in a blocking mode. If the gain of the transistor 52 is a constant $\beta$, the transistor 52 will stay in saturation as long as $\beta i_b 22 i_c$; where $i_b$ and $i_c$ are, respectively, the base and collector current in the transistor 52. When this inequality is no longer satisfied, transistor 52 comes out of saturation, decreasing the voltage drop between terminals A and G on winding 56. This voltage drop is fed back by way of winding 58 to further reduce the base drive to transistor 52 and provides rapid turn-off. The turn off of current flow in the transistor primary then induces a reverse voltage on winding 58 which turns on transistor 50, commutating the inverter output.

The inverter circuit of FIG. 4 is well suited for operation with inductive loads. It may be noted that switching is initiated when the product of the transistor gain times the base current is equal to the transistor collector current. Inductive loads will cause the collector current to increase during a half cycle and thus insures faster and more positive switching. The frequency of the circuit may also be seen to increase with inductive loading. As the inductive loading is increased, the transistor collector current increases more rapidly during each half cycle and the switching inequality is met in a shorter time interval, increasing the operating frequency.

When the power is first applied to the rectifier and filter, its output voltage increases exponentially. The inverter frequency thus starts at a low value and increases to a final operating frequency $$W_R = 1/6\pi \sqrt{LC}$$

which is the lowest frequency at which $\beta i_{b\ T/2} = i_{c\ T/2}$ where T is the inverter period. The choice of the values for inductor 16 and the capacitor 18 is not especially critical in respect to starting; both components can be varied over fairly wide range and the inverter will still be able to find and lock to the resonant frequency. At the resonant condition, a large third harmonic sine wave voltage is developed across the capacitor 18 and applied to the lamp. Once the lamp ignites, however, the impedance of the output circuit changes considerably (FIG. 3) and the resonant peak is substantially eliminated. The operating frequency then increases to a value somewhat above $$1/6\pi \sqrt{LC}$$

in such a manner that, although the fundamental current waveform is resistive in nature, almost all the higher harmonics of the square wave combine to produce an overall inductive current waveform during the steady-state operation. The positive impedance of the inductor 16 at these, harmonic frequencies provide stable operation of the lamp in its negative resistance region.

The above-described circuit resonates the lamp ballast at the third harmonic of the drive wave frequency. It should be obvious, however, that the invention may be practiced at other resonances of the drive frequency. Likewise, although the inductor 16 is illustrated as a separate component it may, in certain applications, be desirable to combine that circuit function with that of the inverter output transformer, in a manner well known to the art.

If desired, inverter oscillation may be started using any of the special circuits which are commonly used for that purpose.

The circuits of the present invention allow efficient resonant starting and stable operation of the discharge lamps with transistor inverter drive. The circuit seeks the resonant starting circuit frequency over a wide range of component values and thus insensitive to the effects of component aging. The inverter circuit shifts to a relatively high frequency after the discharge is initiated assuring stable operation of the lamp in its negative resistance characteristic region.

The invention has been described herein with respect to a specific embodiment thereof. It should be obvious to those skilled in the art that changes in form and detail may be made without departing from the scope of the invention as defined in the following claims.

The invention claimed is:

1. A discharge lamp circuit comprising:
    an output circuit including a discharge lamp, an inductor connected in series with said lamp, and a capacitor connected in parallel with said lamp; and
    a transistorized inverter circuit source of ac voltage connected in series with said output circuit, said source including means for automatically adjusting the frequency of said ac voltage in response to the impedance of said output circuit and functioning so that said ac voltage is adjusted to the approximate resonant frequency of said output circuit as such times as the Q of said output circuit is high and is adjusted away from said resonant frequency at such times as the Q of said output circuit is not high;
    wherein said transistorized inverter comprises:

a transformer including a primary winding defining a first end, a second end, and a center tap, and further including a secondary winding having a first end and a second end, the polarity of said windings being chosen so that the first end of said primary winding is positive when the first end of said secondary winding is positive, the center tap of said primary winding being connected to a first polarity supply voltage;

a first transistor having an emitter connected to a second polarity of said supply voltage, a collector connected to the second end of said primary winding, and a base connected to the first end of said secondary winding;

a first resistor and a first bias diode connected in series between the base of said first transistor and the emitter of said first transistor;

a second transistor having an emitter connected to said second polarity supply voltage, a collector connected to the first end of said primary winding, and a base;

a capacitor connected between the base of said second transistor and the second end of said secondary winding;

a second resistor and a second diode connected between the base of said second transistor and the emitter of said second transistor;

a third diode connected from the collector of said first transistor to the emitter of said first transistor;

a fourth diode connected from the collector of said second transistor to the emitter of said second transistor; and a pair of output terminals connected respectively to the first end of said primary winding and the second end of said primary winding, whereby a square wave voltage is produced between said pair of output terminals.

2. The circuit of claim 1 wherein said transformer comprises autotransformer windings.

3. A transistorized inverter circuit comprising:

a transformer including a primary winding defining a first end, a second end, and a center tap and further including a secondary winding having a first end and a second end, the polarity of said windings being chosen so that the first end of said primary winding is positive when the first end of said secondary winding is positive, the center tap of said primary winding being connected to a first polarity supply voltage;

a first transistor having an emitter connected to a second polarity of said supply voltage, a collector connected to the second end of said primary winding, and a base connected to the first end of said secondary winding;

a first resistor and a first bias diode connected in series between the base of said first transistor and the emitter of said first transistor;

a second transistor having an emitter connected to said second polarity supply voltage, a collector connected to the first end of said primary winding and a base;

a capacitor connected between the base of said second transistor and the second end of said secondary winding;

a second resistor and a second diode connected between the base of said second transistor and the emitter of said second transistor;

a third diode connected from the collector of said first transistor to the emitter of said first transistor;

a fourth diode connected from the collector of said second transistor to the emitter of said second transistor; and a pair of output terminals connected respectively to the first end of said primary winding and the second end of said primary winding, whereby a square wave voltage is produced between said pair of output terminals.

* * * * *